United States Patent
Barowski et al.

(10) Patent No.: US 8,255,726 B2
(45) Date of Patent: Aug. 28, 2012

(54) ZERO INDICATION FORWARDING FOR FLOATING POINT UNIT POWER REDUCTION

(75) Inventors: Harry S. Barowski, Boeblingen (DE); Maarten J. Boersma, Holzgerlingen (DE); Silvia M. Mueller, Altdorf (DE); Tim Niggemeier, Laatzen (DE); Jochen Preiss, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 12/176,191

(22) Filed: Jul. 18, 2008

(65) Prior Publication Data

US 2010/0017635 A1 Jan. 21, 2010

(51) Int. Cl.
*G06F 1/00* (2006.01)

(52) U.S. Cl. ......... 713/324; 713/300; 713/320; 713/322

(58) Field of Classification Search .................. 713/322, 713/300, 320, 324
See application file for complete search history.

(56) References Cited

U.S. PATENT DOCUMENTS

| | | | | |
|---|---|---|---|---|
| 5,392,437 A * | 2/1995 | Matter et al. | ................. | 713/324 |
| 5,642,306 A | 6/1997 | Mennemeier et al. | | |
| 5,726,921 A * | 3/1998 | Krick | ............................ | 713/321 |
| 6,035,315 A * | 3/2000 | Krick | ............................ | 708/490 |
| 6,088,808 A * | 7/2000 | Iwamura et al. | ............... | 713/324 |
| 6,247,134 B1 * | 6/2001 | Sproch et al. | ................. | 713/320 |
| 6,611,920 B1 * | 8/2003 | Fletcher et al. | ................. | 713/322 |
| 6,745,336 B1 * | 6/2004 | Martonosi et al. | ............. | 713/340 |
| 7,020,789 B2 * | 3/2006 | Sperber et al. | ................. | 713/324 |
| 7,058,830 B2 * | 6/2006 | Dhong et al. | .................. | 713/320 |
| 7,107,471 B2 * | 9/2006 | Feierbach | ...................... | 713/324 |
| 7,133,890 B2 * | 11/2006 | Steele, Jr. | ....................... | 708/495 |
| 7,137,021 B2 * | 11/2006 | Dhong et al. | .................. | 713/324 |
| 7,506,185 B2 * | 3/2009 | Lin | ................................ | 713/300 |
| 7,631,207 B1 * | 12/2009 | Song et al. | ..................... | 713/320 |
| 7,802,118 B1 * | 9/2010 | Abdalla et al. | ................. | 713/322 |
| 7,890,782 B2 * | 2/2011 | Abernathy et al. | ............ | 713/300 |
| 2003/0126173 A1 * | 7/2003 | Steele, Jr. | ....................... | 708/495 |
| 2004/0230849 A1 * | 11/2004 | Dhong et al. | .................. | 713/320 |
| 2006/0179104 A1 * | 8/2006 | Steele, Jr. | ....................... | 708/671 |
| 2008/0141046 A1 * | 6/2008 | Chen et al. | ..................... | 713/300 |

* cited by examiner

*Primary Examiner* — Thomas Lee
*Assistant Examiner* — Jaweed A Abbaszadeh
(74) *Attorney, Agent, or Firm* — Yudell Isidore Ng Russell PLLC

(57) ABSTRACT

A method, system and computer program product for reducing power consumption when processing mathematical operations. Power may be reduced in processor hardware devices that receive one or more operands from an execution unit that executes instructions. A circuit detects when at least one operand of multiple operands is a zero operand, prior to the operand being forwarded to an execution component for completing a mathematical operation. When at least one operand is a zero operand or at least one operand is "unordered", a flag is set that triggers a gating of a clock signal. The gating of the clock signal disables one or more processing stages and/or devices, which perform the mathematical operation. Disabling the stages and/or devices enables computing the correct result of the mathematical operation on a reduced data path. When a device(s) is disabled, the device may be powered off until the device is again required by subsequent operations.

14 Claims, 4 Drawing Sheets

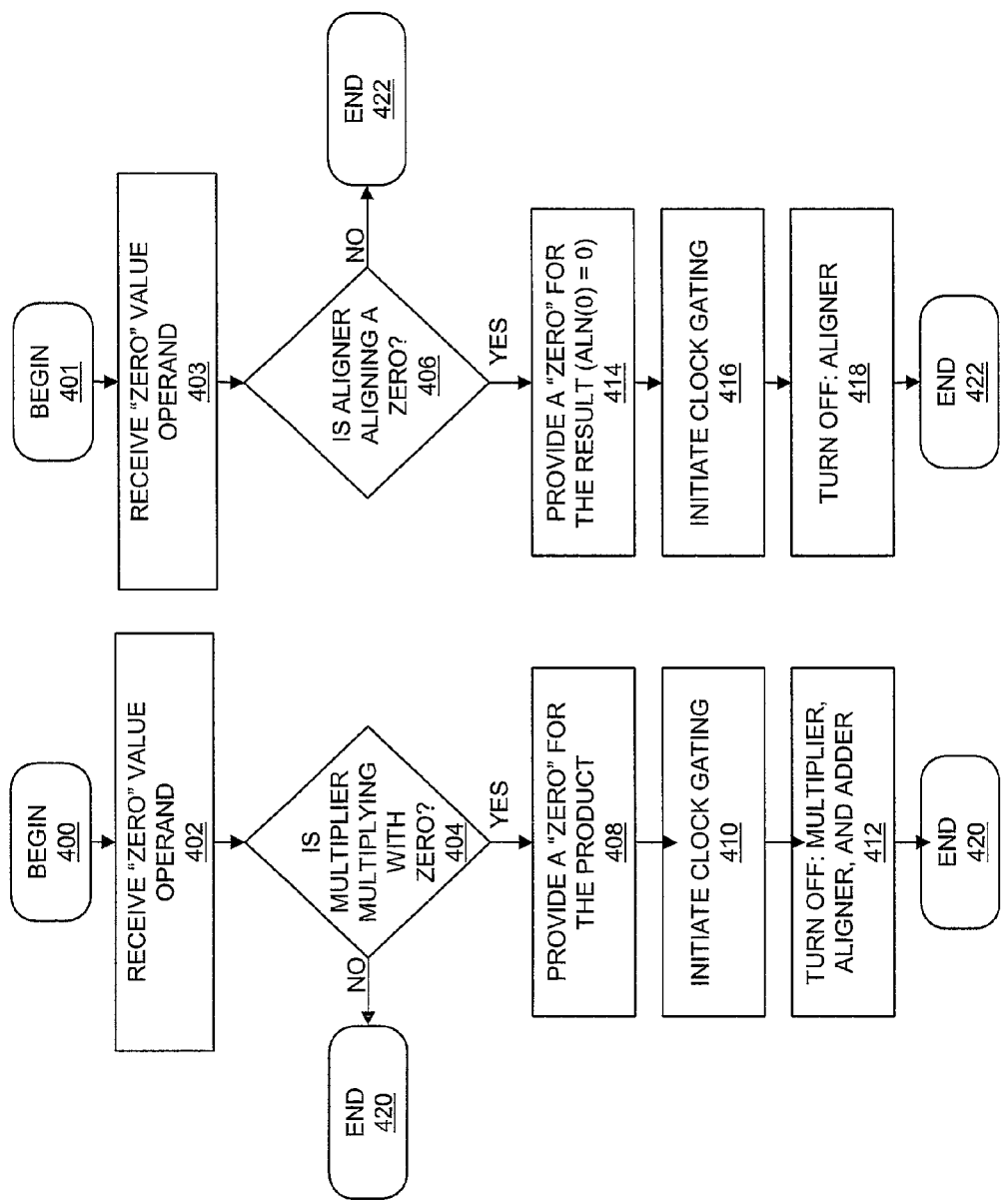

ZERO INDICATION FORWARDING FOR FLOATING POINT UNIT POWER REDUCTION

BACKGROUND

1. Technical Field

The invention relates generally to computer systems and, more particularly, to power management of functional units of microprocessors.

2. Description of the Related Art

Generally, microprocessors have one or more functional units, which execute instructions. These functional units, which include floating-point units (FPUs) and fixed-point units (FXU), among others, contribute significantly to the power consumption of microprocessors. Therefore, a need exists for reducing power consumption in the functional units of microprocessors without affecting the performance.

The market for battery-powered systems is expanding at a rapid rate, in which the battery life of a system is important and power is at a premium. Lower power consumption of microprocessors is an important consideration for logic and device design. Due to the complex designs and large on-chip caches, power consumption of modern microprocessor chips is a primary design factor that determines the commercial success of most modern microprocessor products.

SUMMARY OF ILLUSTRATIVE EMBODIMENTS

Disclosed are a method, system and circuitry for reducing power consumption when processing mathematical operations. Power may be reduced in processor hardware devices that receive one or more operands from an execution unit that executes instructions. A circuit detects when at least one operand of multiple operands is a zero operand, prior to the operand being forwarded to an execution component for completing a mathematical operation. When at least one operand is a zero operand or at least one operand is "unordered", a flag is set that triggers a gating of a clock signal. The gating of the clock signal disables one or more processing stages and/or devices, which perform the mathematical operation. Disabling the stages and/or devices reduces the active data path without affecting the result of the mathematical operation. When a device(s) is disabled, the device may be powered off until the device is again required by subsequent operations. The above as well as additional features of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein:

FIG. 4 is a logic flow chart describing bypassing mathematical operations when utilizing an FPU according to one embodiment of the invention.

DETAILED DESCRIPTION OF AN ILLUSTRATIVE EMBODIMENT

The illustrative embodiments provide a method, system and circuitry for reducing power consumption when processing mathematical operations. Power may be reduced in processor hardware devices that receive one or more operands from an execution unit that executes instructions. A circuit detects when at least one operand of multiple operands is a zero operand, prior to the operand being forwarded to an execution component for completing a mathematical operation. When at least one operand is a zero operand or at least one operand is "unordered", a flag is set that triggers a gating of a clock signal. The gating of the clock signal disables one or more processing stages and/or devices, which perform the mathematical operation. Disabling the stages and/or devices reduces the active data path without affecting the result of the mathematical operation. When a device(s) is bypassed, the device may be powered off until the device is again required by subsequent operations.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

The specific numerals assigned to the elements are provided solely to aid in the description and not meant to imply any limitations (structural or functional) on the invention. It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically utilized herein the term "unordered" is an operand that is one of a non-number or infinity.

Figure 1:
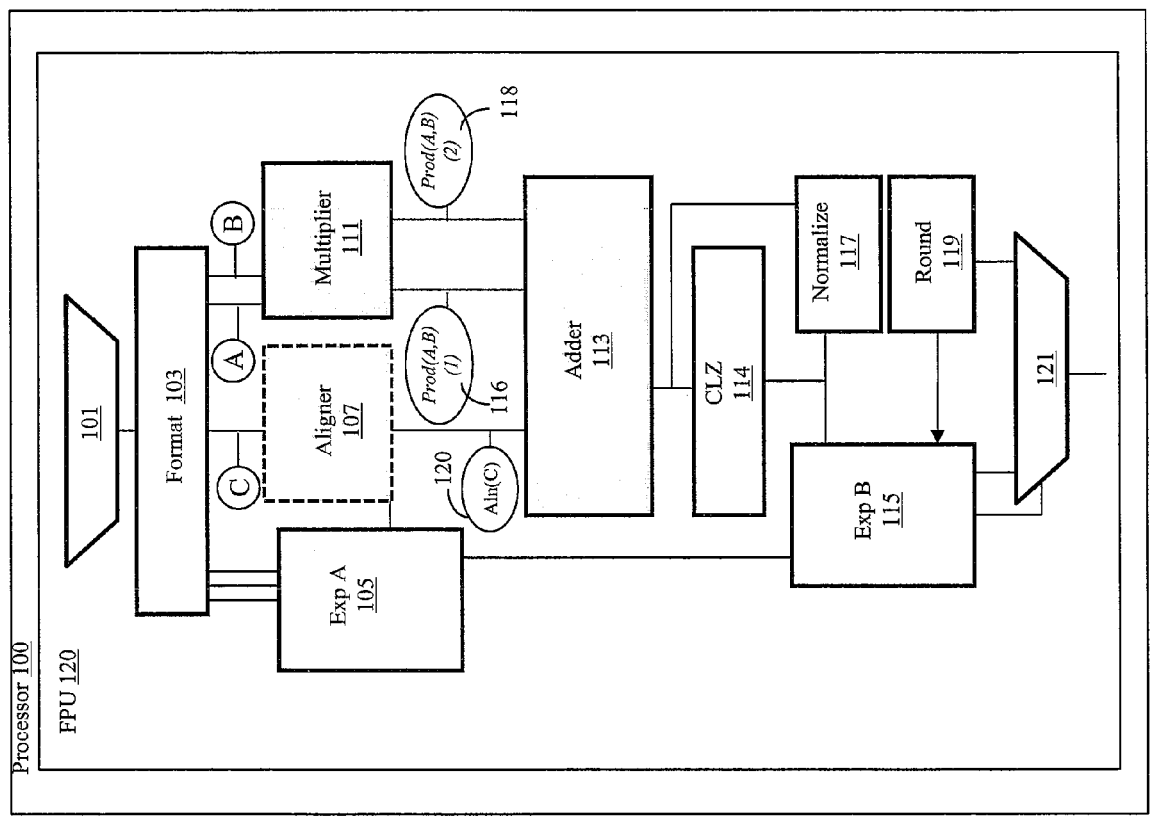
FIG. 1 is a block diagram of a fused multiply add (FMA) type floating point unit (FPU) within a processor, in accordance with one embodiment of the invention.

With reference now to FIG. 1, wherein a fused multiply add (FMA) type floating point unit (FPU) is depicted within a processor 100 (although FPU may not necessarily be within a larger processing device). FPU 120 comprises multiplexer A 101 with a single output to format 103. Format 103 outputs to exponent (Exp) circuit A 105, outputs "C" to aligner 107, and outputs "A" and "B" to multiplier 111. Aligner 107 outputs a single value, Aln(c) 120, to adder 113 and multiplier 111 outputs two separate values, prod $(A,B)_1$ 116 and prod$(A,B)_2$ 118 to adder 113. Exp circuit A 105 outputs to Exp circuit B 115. Count leading zeros (CLZ) 114 receives output from adder 113. CLZ 114 outputs to Exp circuit B 115 as well as normalize 117. Normalize 117 also receives input from adder 113. Round 119 outputs to Exp circuit B 115 and multiplexer B 121. Exp circuit B 115 outputs two values to multiplexer B 121. The processor components that enable the different aspects of the invention may generally be referred to as logic or logic components.

In one embodiment, FPU 120 data paths are designed to complete the operation of "product(A, B)+aligned(C). Multiplier 111 and aligner 107 are featured early in the FPU pipeline of operations. Multiplier 111 and aligner 107 are equal to approximately 40% of the power usage for FPU 120, with each component equally contributing. When A=0 or B=0 the product of multiplier 111 is equivalent to zero (prod(A, B)=0). When the operation of A*B+C is processed, the product of A and B is equal to zero, therefore the result of the operation is C (i.e. A*B+C=C). Multiplier 111, aligner 107, and adder 113 are not required for the mathematical correctness when A or B is equal to zero, thereby approximately 50% of the area of FPU 120 is inactive.

In one embodiment, FPU 120 data paths are designed to complete the operation of "product(A,B)+aligned(C)". Alignment of C is needed for mathematical correctness of the floating-point addition in A*B+C. When C=0, the aligned addend is equal to 0. (aln(C)=0). When the operation of A*B+C is processed and C=0, therefore the result of the operation is A*B (i.e. A*B+C=A*B). Aligner 107 is not required for the mathematical correctness when C is equal to zero, thereby approximately 20% of the area of FPU 120 is inactive.

In one embodiment, unnecessary parts of the data path are disabled when the clock signals are gated. When the operand of A, B, and/or C are equivalent to zero, a zero indication bit is stored in a register file. The operand is forwarded by FPU 120, along with the zero indication bit. In response to at least one operand being a zero operand, or at least one operand being unordered, flag is set that triggers the gating of a clock signal. Gating of the clock signal disables one or more processing stages/devices (multiplier 111, aligner 107, and/or adder 113), which perform the mathematical operation, reducing the active datapath area but still computing the correct result.

Figure 2:
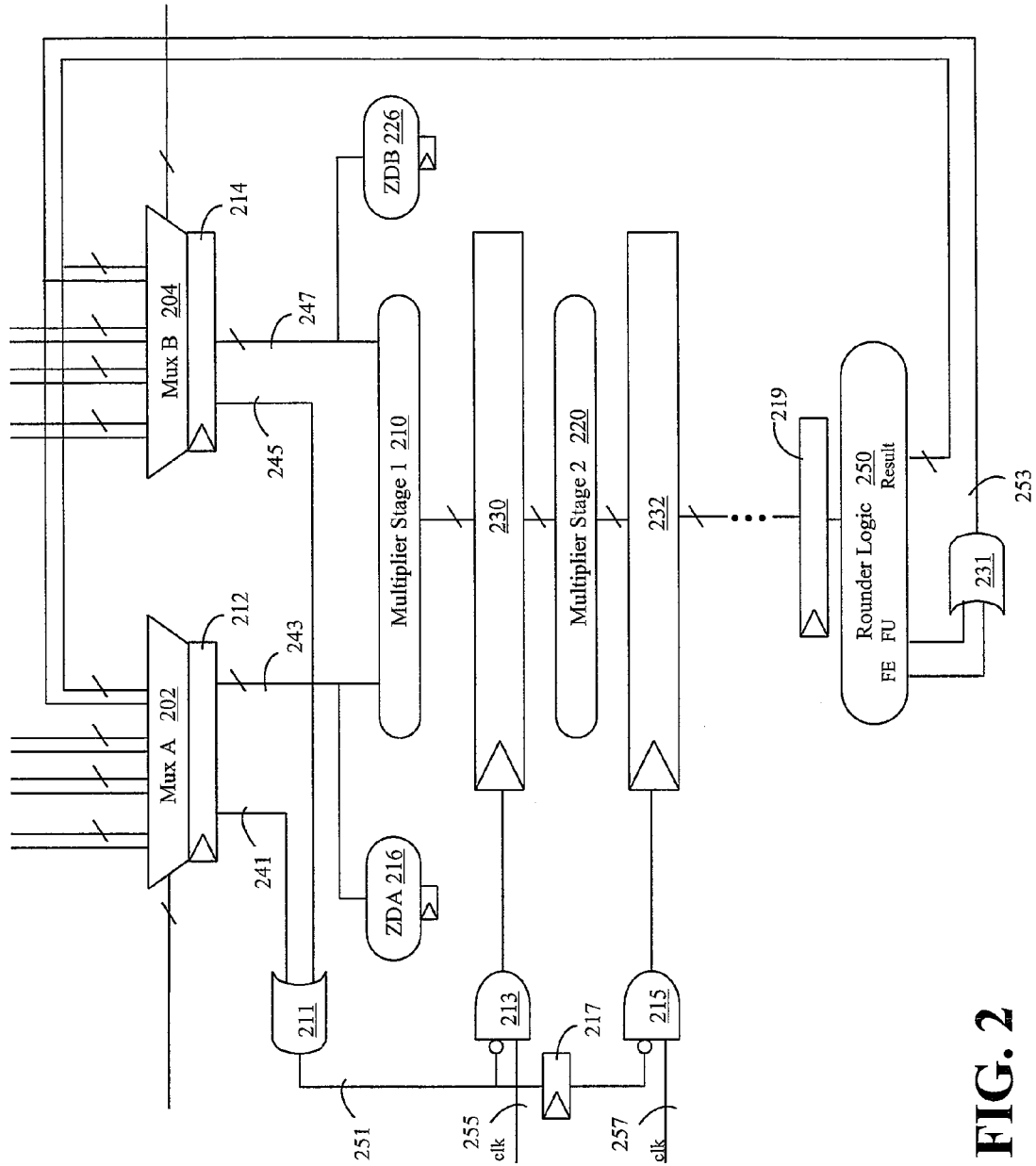
FIG. 2 schematically depicts a FPU, according to one embodiment of the invention.

FIG. 2 schematically depicts FPU circuitry. Mux A 202 and Mux B 204 are coupled to latch A 212 and latch B 214, respectively. Mux A 202 outputs fracAzero 241 to OR gate 211, and mux A outputs fracA 243 to multiplier stage 1 210 and zero detect A (ZDA) 216. Mux B 204 outputs fracBzero 245 to OR gate 211, mux B 204 outputs fracB 247 to multiplier stage 1 210 as well as zero detect B (ZDB) 226.

OR gate A 211 outputs productzero 251 to "not" input of AND gate 213. AND gate A 213 receives clock (clk) input A 255, also, and outputs to operational latch A 230. Latch C 217 receives productzero 251 and outputs product zero 251 to the "not" input of the AND gate B 215. AND gate B 215 receives clock (clk) input B 257 AND gate B 215 outputs to operational latch B 232. Multiplier Stage B 220 receives input from operational latch A 230, and multiplier stage B 220 outputs to operational latch B 232. Latch D 219 receives the input from intermediate operations (not shown) and outputs to rounder logic 250. Rounder logic produces "FE", "FU", and "result". FE and FU are input into OR gate B 231 and the output of fraczero 253 is input into Mux A 202 and Mux B 204. "Result" from rounder logic 250 outputs to mux A 202 and mux B 204.

In one embodiment, a flag is set that triggers a gating of a clock signal. FracAzero 241 and fracBzero 245 are flags produced as the output of Mux A 202 and Mux B 204, respectively. FracAzero 241 and fracBzero 245 are computed from FE and FU which are flags of rounder logic 250. When "result" of rounder logic is '0', FE flag is '1', otherwise, FE flag is '0'. The FU flag is '1' if result is unordered, and '0' otherwise. Therefore the values of FE and FU are input into OR gate B 231. The logical OR of the flags of FE and FU are utilized as the flag of fraczero 253.

In one embodiment, fraczero 253 is received by mux A 202 and mux B 204. When the flag of fraczero 253 is equivalent to one, the FPU does not have to wait for detection of a zero value to complete. The flag of fraczero 253 is a correct prediction of the operand that will result from the FPU network. Thereby the flag of fraczero 253 is received early enough to trigger the gating of the clock signal to disable multiplier stage A 210 and multiplier stage B 220. An underestimation may also be utilized to estimate the flag of fraczero 253.

Figure 3:
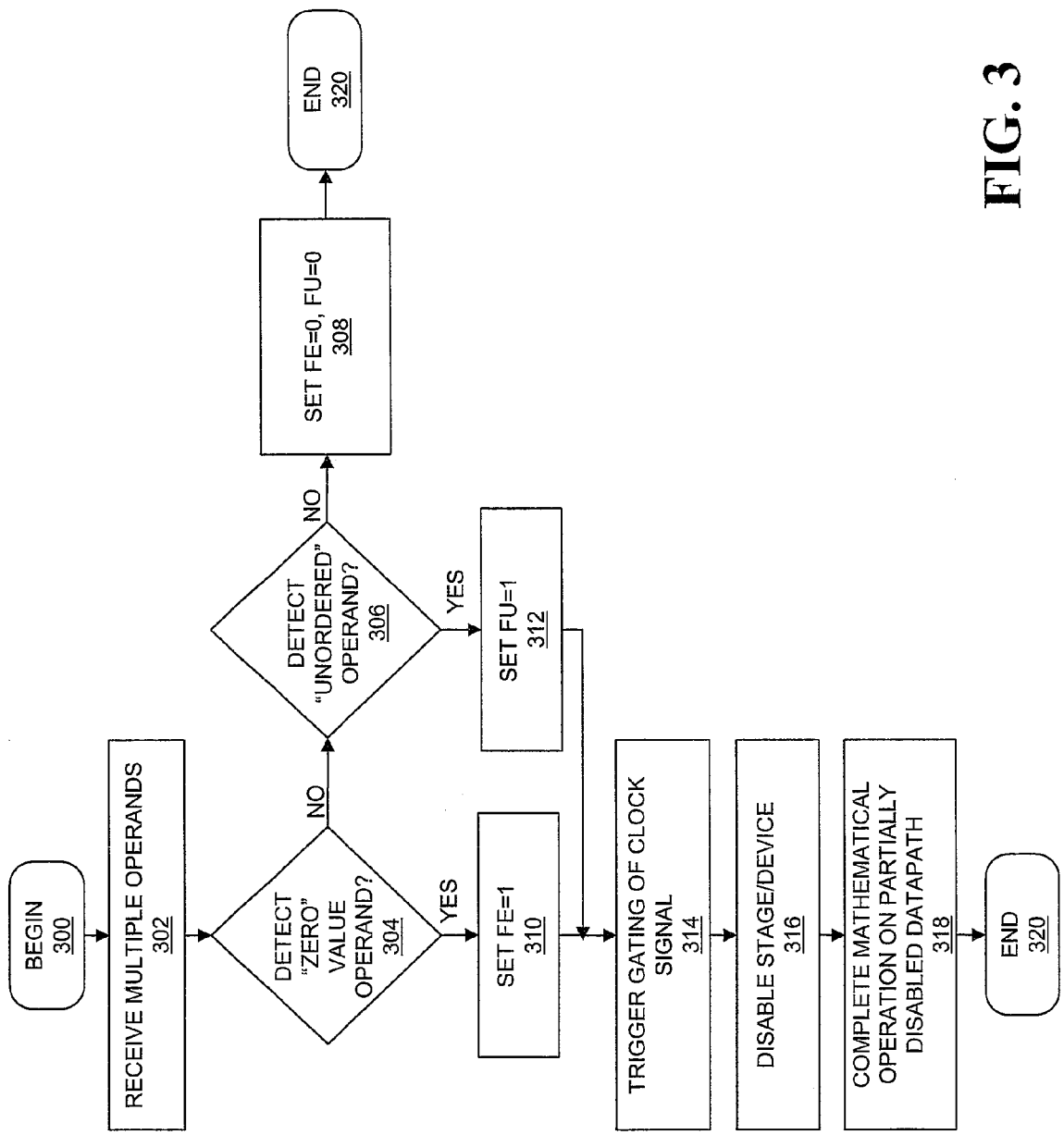
FIG. 3 is a logic flow chart for triggering the gating of the clock signal according to the value of the operand, in accordance with one embodiment of the invention.

FIGS. 3-4 are flow charts illustrating various methods by which the above processes of the illustrative embodiments are completed. Although the methods illustrated in FIGS. 3-4 may be described with reference to components shown in FIGS. 1-2, it should be understood that this is merely for convenience and alternative components and/or configurations thereof can be employed when implementing the various methods.

FIG. 3 describes the method of triggering the gating of the clock signal according to the value of the operand. The process of FIG. 3 begins at initiator block 300 and proceeds to block 302, at which multiple operands are received within the FPU. A decision is made at block 304 whether a zero is detected among the operands. If a zero is detected the process continues to block 310. If a zero is not detected, the process continues to block 306. "FE" is set equal to one at block 310. At block 306 a decision is made whether an unordered operand is detected. If an unordered operand is detected, the process continues to block 312. If an unordered operand is not detected, the process continues to block 308. At block 308 FE is set equal to zero and FU is set equal to 0. The process ends at block 320. When an unordered operand is detected, FU is set equal to one at block 312.

When FE is set equal to one, or FU is set equal to one, the process continues to block 314. At block 314 the gating of the clock signal is triggered. Stages and/or devices that are not required for mathematical computations are disabled, at block 316. At block 318 the remaining mathematical operations are completed on a partially disabled data path. The process ends at block 320.

FE/FU flags are not novel to the invention, nor are the method in which the FE/FU flags are set. FE/FU flags are as defined in the PowerPC architecture and apply to the result of the mathematical operation of the FPU. One embodiment of the invention is to reuse FE/FU flags (automatically available with the PowerPC architecture) for the purpose of clock gating in a subsequent instruction that utilizes the result as one or more operands.

FIG. 4A describes the method for bypassing mathematical operations when multiplying while utilizing an FPU. The process begins at block 400 and continues to block 402 wherein a zero value for the operand is received. A decision is made at block 404 whether the operation to be performed is multiplying with zero. If the operation to be performed is multiplying with zero, the process continues to block 408. If the operation to be performed is not multiplying with zero, the process ends at block 420. At block 408 a zero is provided for the product. Clock gating is initiated at block 410. Multiplier, aligner and, adder are turned off at block 412. The process ends at block 420.

FIG. 4B describes the method for bypassing an align operation utilizing an FPU. The process begins at block 401 and continues to block 403 wherein a zero value for the operand is received. A decision is made at block 406 whether the aligner aligns a zero operand. If the aligner aligns a zero operand, the process continues to block 414. If the aligner does not align a zero, the process ends at block 422. At block 414, a zero is provided for the flag representing the result of align (aln(0) =0). The clock gating is initiated at block 416. The Aligner is turned off at block 418. The process ends at block 422.

Generally, the above described embodiments include a method for reducing power consumption when processing mathematical operations. The mathematical operations are processed utilizing processor hardware devices that receive one or more operands from an execution unit which executes instructions. Based on flags, a detection is made when at least one operand of multiple operands is a zero, not-a-number, or an infinity, without inspecting the operand. In response to at least one operand being a zero, not-a-number, or infinity, the gating of a plurality of clock signals within the circuit is triggered. Gating of the clock signals disables a plurality of processing stages and devices not needed for performing the mathematical operation.

A method is also described for computing flags that indicate a zero, not-a-number, or an infinity operand in an early instruction, then utilizing the result as an operand in a later computation. The flags may accompany and/or replace one or more computed results.

In the above embodiments a method for forwarding the flags or keeping the flags in storage is generally described. When disabled processing stages and devices contain a multiplier circuit, the multiplier output is forced to zero in response to the zero flag that is set for one or more of the operands. When the disabled processing stages and devices contain an adder circuit, the adder is forced to output to the nonzero operand in response to the zero flag that is set for one or more operands.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processor, a method for reducing power consumption when processing mathematical operations by utilizing processor hardware devices that receive one or more operands from an execution unit, the method comprising:
    detecting when at least one operand of multiple operands is a zero operand before the operand is forwarded to an execution component for completing a mathematical operation;
    in response to at least one operand being a zero operand or being unordered, setting a first flag that triggers a gating of a clock signal, wherein the gating reduces an active floating point unit (FPU) data path by disabling select processing devices/stages of one or more processing stages/devices within the FPU data path and enables a bypassing of the completion of the mathematical operation, wherein an operand is unordered if the operand is one of a non-number or infinity;
    in response to the first flag being set, gating the clock signal to disable only select processing stages/devices of the one or more processing stages/devices within the FPU data path, wherein the select processing stages/devices are not needed to calculate a result of the mathematical operation, and wherein needed processing stages/devices for calculating the result are left active;
    in response to the at least one disabled processing stages/devices containing a multiplier circuit, forcing the multiplier output to zero during the second computation when the one or more operands yields a zero; and
    in response to the at least one disabled processing stages/devices containing an adder circuit, forcing the adder output to the nonzero operand when the zero operand is input for one operand in the second computation.

2. The method of claim 1, further comprising:
    computing the first flag to yield a result in a first computation that indicates one or more of: a zero, not-a-number, and infinity, wherein the result is input as an operand in a second computation; and
    storing one or more flags in a storage.

3. The method of claim 1, further comprising, wherein the first flag is one of an FE flag or an FU flag set in a processor, wherein when the FE flag is set responsive to detecting that one of the operands is a zero, and wherein the FU flag is set responsive to one of the operands being unordered.

4. The method of claim 3, further comprising, reusing the FE/FU flags for gating of the clock signal in subsequent instructions.

5. The method of claim 1, further comprising:
    in response to the first flag being set, deterministically evaluating a result of the mathematical operation, without performing the mathematical operation based on known characteristics of the mathematical operation when one of the operands is a zero.

6. The method of claim 5, wherein the deterministically evaluating further comprises:
    in response to the mathematical operation being a multiply operation, automatically providing a zero as the result of the mathematical operation; and
    in response to the mathematical operation being an add operation, automatically providing a sum of non-zero operands as the result of the mathematical operation.

7. The method of claim 1, wherein the one or more processing stages/devices of the FPU data path comprises at least a multiplier, an aligner, and an adder.

8. The system of claim 7, wherein the logic that deterministically evaluates a result of the mathematical operation further comprises logic that:
    in response to the mathematical operation being a multiply operation, automatically provides a zero as the result of the mathematical operation; and
    in response to the mathematical operation being an add operation, automatically provides a sum of non-zero operands as the result of the mathematical operation.

9. In data processor, a system for reducing power consumption when processing mathematical operations by disabling one or more processing stages/devices of a floating point unit (FPU) data path of within at least one processor that receives one or more operands from an execution unit, the system having logic embodied therein that:
    detects when at least one operand of multiple operands is a zero operand before the operand is forwarded to an execution component for completing a mathematical operation;
    in response to at least one operand being a zero operand or at least one operand being unordered, sets a first flag that triggers a gating of a clock signal, wherein the gating reduces an active floating point unit (FPU) data path by disabling select processing devices/stages of one or more processing stages/devices within the FPU data path that perform the mathematical operation and enables a bypassing of the completion of the mathematical operation, wherein an operand is unordered if the operand is one of a non-number or infinity;
    in response to the first flag being set, gates the clock signal to disable only select processing stages/devices of the one or more processing stages/devices within the FPU data path, wherein the select processing stages/devices are not needed to calculate a result of the mathematical operation, and wherein needed processing stages/devices for calculating the result are left active;

in response to the at least one disabled processing stages/devices containing a multiplier circuit, forces the multiplier output to zero during the second computation when the one or more operands yields a zero; and in response to the at least one disabled processing stages/devices containing an adder circuit, forces the adder output to the nonzero operand when the zero operand is input for one operand in the second computation.

10. The system of claim 9, the logic further comprising logic that:

computes the first flag to yield a result in a first computation that indicates one or more of: a zero, not-a-number, and infinity, wherein the result is input as an operand in a second computation;

stores one or more flags in a storage.

11. The system of claim 9, wherein the first flag is one of an FE flag or an FU flag set in a processor, wherein when the FE flag is set responsive to detecting that one of the operands is a zero, and wherein the FU flag is set responsive to one of the operands being unordered.

12. The system of claim 11, the logic further comprising logic that reuses the FE/FU flags for gating of the clock signal in subsequent instructions.

13. The system of claim 9, the logic further comprising logic for that:

in response to the first flag being set, deterministically evaluates a result of the mathematical operation, without performing the mathematical operation based on known characteristics of the mathematical operation when one of the operands is a zero.

14. The system of claim 9, wherein the one or more processing stages/devices of the FPU data path comprises at least a multiplier, an aligner, and an adder.

* * * * *